(12) United States Patent
Tsuneyama

(10) Patent No.: US 9,231,854 B2
(45) Date of Patent: Jan. 5, 2016

(54) INFORMATION PROCESSING DEVICE AND IMAGE FORMING APPARATUS

(71) Applicant: KYOCERA Document Solutions Inc., Osaka (JP)

(72) Inventor: Takeo Tsuneyama, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/893,529

(22) Filed: May 14, 2013

(65) Prior Publication Data

US 2013/0314743 A1 Nov. 28, 2013

(30) Foreign Application Priority Data

May 24, 2012 (JP) .................. 2012-118270

(51) Int. Cl.
*H04L 12/761* (2013.01)
*H04L 12/773* (2013.01)
*H04N 1/00* (2006.01)
*G06F 9/455* (2006.01)

(52) U.S. Cl.
CPC ............ *H04L 45/16* (2013.01); *G06F 9/45558* (2013.01); *H04L 45/60* (2013.01); *H04N 1/0083* (2013.01); *G06F 2009/45595* (2013.01)

(58) Field of Classification Search
USPC .......... 370/290, 235; 358/1.15; 709/277, 227, 709/232
See application file for complete search history.

(56) References Cited

U.S. PATENT DOCUMENTS

2008/0028077 A1* 1/2008 Kamata et al. ................ 709/227
2012/0257623 A1* 10/2012 Huang et al. .................. 370/390
2014/0050091 A1* 2/2014 Biswas et al. ................. 370/235

FOREIGN PATENT DOCUMENTS

JP 2009-116561 5/2009

* cited by examiner

*Primary Examiner* — Jerome Grant, II

(57) ABSTRACT

An information processing device according to an aspect of the present disclosure includes: a multi-core processor including plural cores; a virtual network connecting the plural cores to each other; a network interface; a router function unit configured, in a core of the plural cores, to act as a router between the virtual network and a local network to which the network interface is connected; and a forward processing unit configured, in the core that the router function unit exists, to forward either a multicast packet or a broadcast packet on the virtual network to the local network.

8 Claims, 3 Drawing Sheets

INFORMATION PROCESSING DEVICE AND IMAGE FORMING APPARATUS

CROSS-REFERENCE TO RELATED APPLICATIONS

This application relates to and claims priority rights from a Japanese Patent Application No. 2012-118270, filed on May 24, 2012, the entire disclosures of which are hereby incorporated by reference herein.

BACKGROUND

1. Field of the Invention

The present invention relates to an information processing device and an image forming apparatus.

2. Description of the Related Art

Recent high performance processors are making virtualization technology popular. Virtualization technology enables cores of a multi-core CPU (Central Processing Unit) to run respective operating systems and cause the operating systems to perform respective different processes in parallel. In such a case, a virtual network may be built to perform communication between the cores.

FIG. 3 shows a block diagram which indicates an example of a software configuration and a network configuration in an information processing device which includes a multi-core CPU. In the configuration shown in FIG. 3, a CPU 101 includes four cores 111 to 114 which are connected to each other through a virtual network 102.

One core of the cores 111 to 114 (here, the core 114) controls a network interface 103 and performs a communication process for an external local network 201. By executing a predetermined program, the core 114 forms not only a communicating unit 121 which performs a communication process for the virtual network 102 but a communicating unit 122 which performs a communication process for the local network 201, and further forms a router function unit 123 which performs routing between the virtual network 102 and the local network 201 as two different IP networks.

Since the router function unit 123 exists in one core (i.e. the core 114) in the CPU 101, the other cores 111 to 113 (i.e. programs therein) perform communication through the router function unit 123 with another device on the local network 201.

When the cores 111 to 113 (i.e. programs therein) transmit a unicast packet to the virtual network 102 to communicate through the router function unit 123 with another device on the local network 201, this packet passes through the router function unit 123, is transmitted to the local network 201, and reaches the destination device.

However, when the cores 111 to 113 (i.e. programs therein) transmit either a multicast packet or a broadcast packet to the virtual network 102, the router function unit 123 does not pass along the packet, and therefore, the cores 111 to 113 (i.e. programs therein) do not have means for a multicast packet and a broadcast packet to reach a device on the local network 201.

SUMMARY

An information processing device according to an aspect of the present disclosure includes: a multi-core processor including plural cores; a virtual network connecting the plural cores to each other; a network interface; a router function unit configured, in a core of the plural cores, to act as a router between the virtual network and a local network to which the network interface is connected; and a forward processing unit configured, in the core that the router function unit exists, to forward either a multicast packet or a broadcast packet on the virtual network to the local network.

An image forming apparatus according to an aspect of the present disclosure includes the aforementioned information processing device.

These and other objects, features and advantages of the present invention will become more apparent upon reading of the following detailed description along with the accompanied drawings.

DETAILED DESCRIPTION

Hereinafter, an embodiment according to an aspect of the present disclosure will be explained with reference to drawings.

Figure 1:
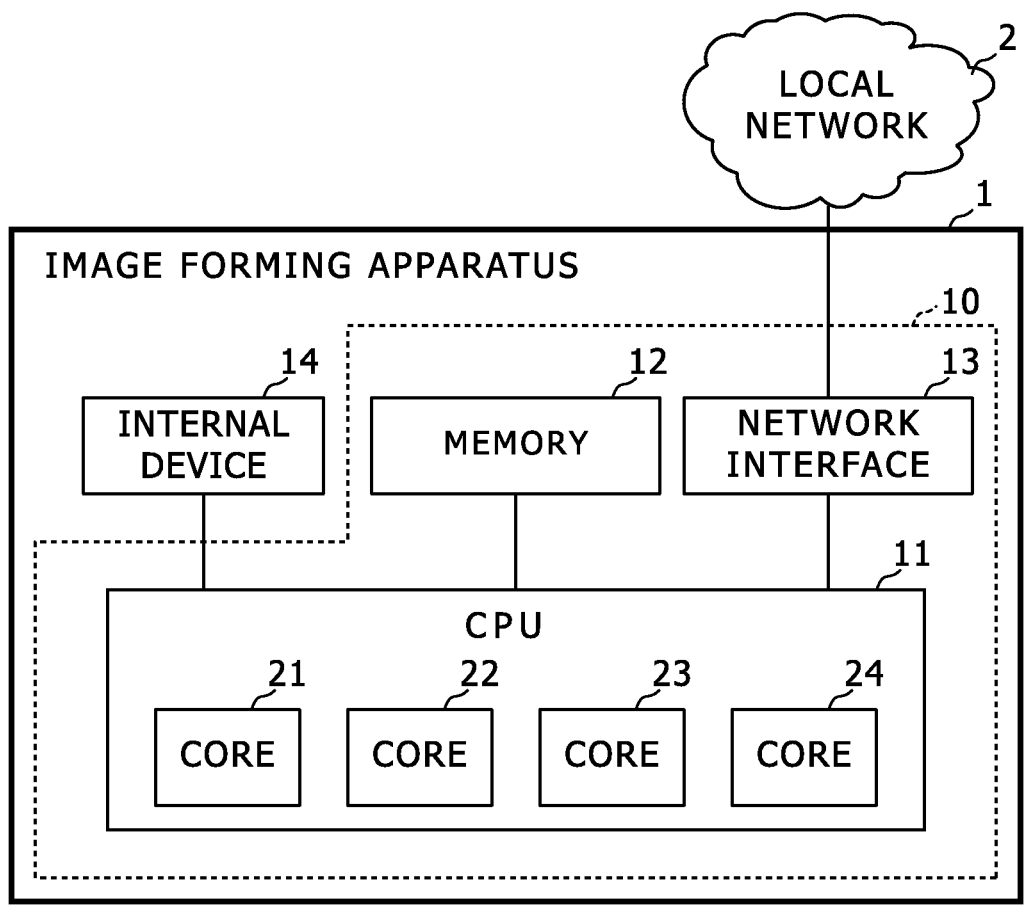
FIG. 1 shows a block diagram which indicates a hardware configuration of an image forming apparatus according to an embodiment of the present disclosure.

FIG. 1 shows a block diagram which indicates a hardware configuration of an image forming apparatus 1 according to an embodiment of the present disclosure. The image forming apparatus 1 shown in FIG. 1 is an apparatus such as a printer or a multifunction peripheral and includes an information processing device 10. The information processing device 10 includes a CPU 11, a memory 12 such as a RAM (Random Access Memory), and a network interface 13.

The CPU 11 include plural (here, four) cores 21 to 24 and performs asymmetric parallel processing. In this embodiment, using virtualization technology, the cores 21 to 24 run respective operating systems.

The memory 12 is a device which stores a program and data to be used by the CPU 11. The memory 12 is used as a shared memory of the cores 21 to 24.

The network interface 13 is connected to an external local network 2 and performs data communication with another device on the local network 2.

Further, an internal device 14 is a device which is controlled by this information processing device 10 and brings a specific function (such as a printing function or an image scanning function) in the image forming apparatus 1.

Figure 2:
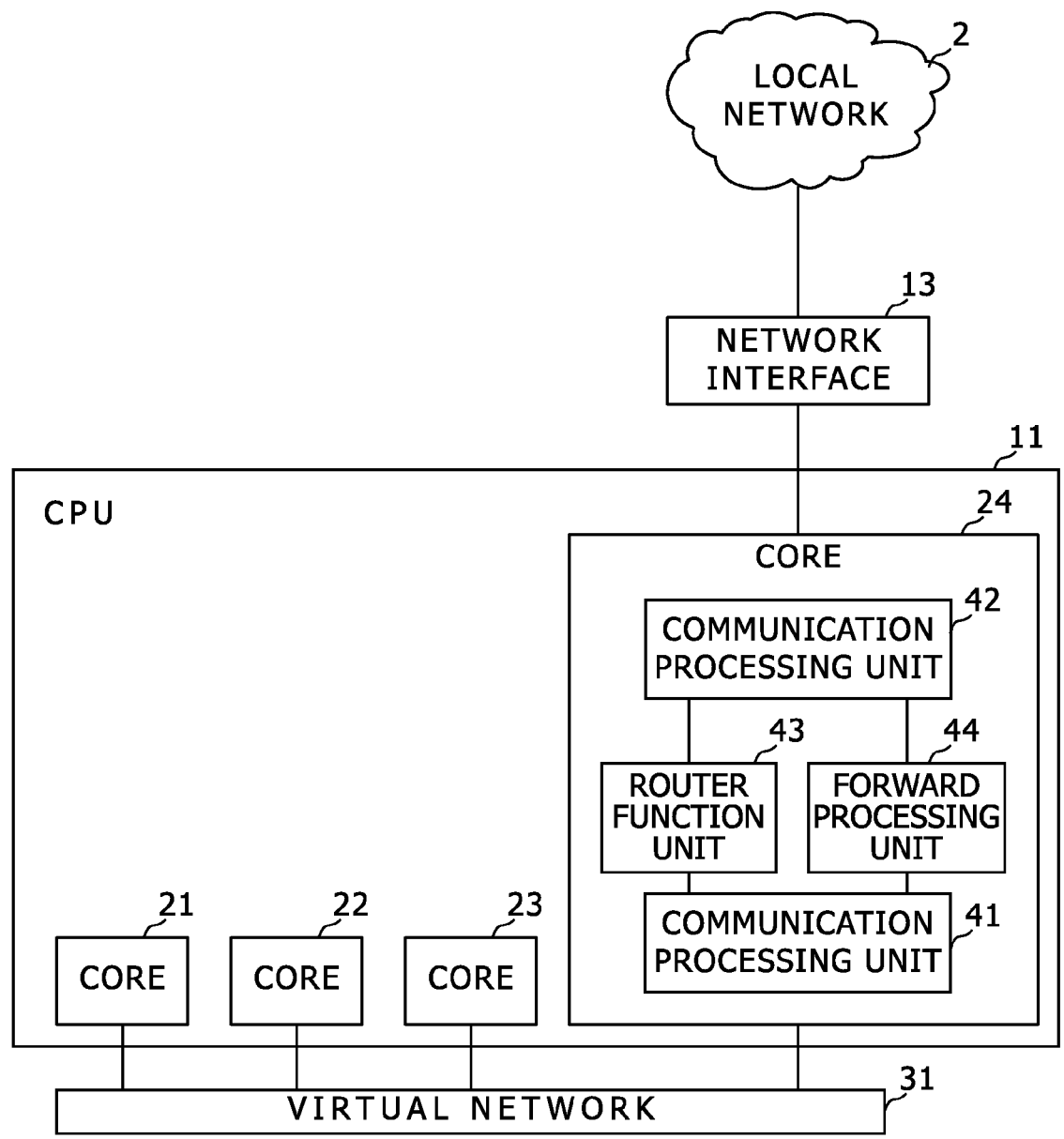
FIG. 2 shows a block diagram which indicates a software configuration and a network configuration in the information processing device in FIG. 1.
Figure 3:
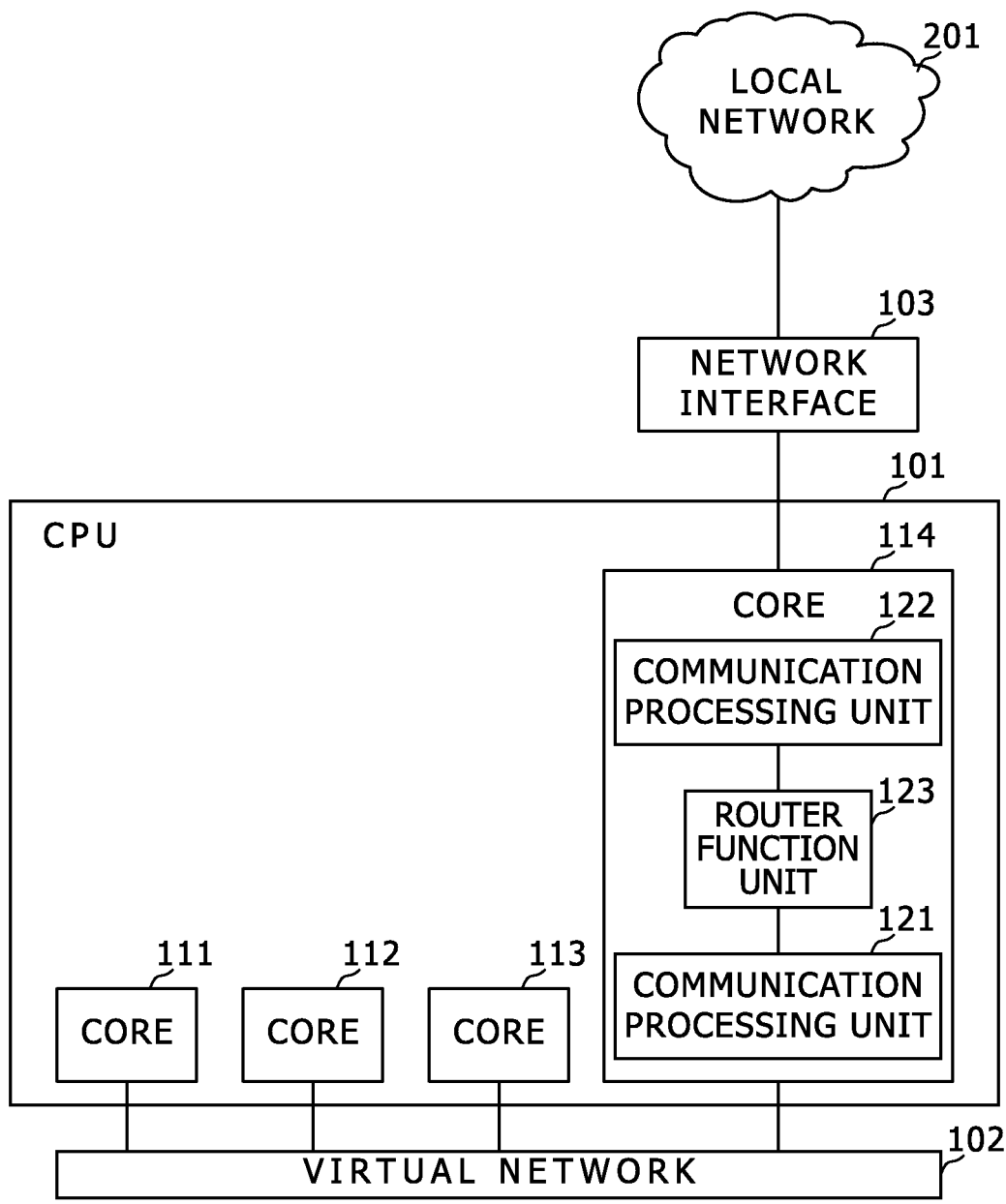
FIG. 3 shows a block diagram which indicates an example of a software configuration and a network configuration in an information processing device which includes a multi-core CPU.

FIG. 2 shows a block diagram which indicates a software configuration and a network configuration in the information processing device 10 in FIG. 1.

As shown in FIG. 2, the cores 21 to 24 are connected to each other through a virtual network 31 using virtualization technology.

In this embodiment, network processing is assigned to the core 24.

Therefore, by executing un-shown program, the core 24 forms a communicating processing unit 41, a communicating processing unit 42, a router function unit 43, and a forward processing unit 44.

The communicating processing unit 41 performs virtual network communication with the other cores 21 to 23 through the virtual network 31.

The communicating processing unit 42 controls the network interface 13 and performs network communication with another device connected to the local network 2.

The router function unit 43 performs routing between the virtual network 31 and the local network 2 as two IP networks different from each other. The router function unit 43 performs address conversion for a unicast packet received from one of the communication processing units 41 and 42, and transmits the packet through the other of the communication processing units 41 and 42.

On the other hand, the router function unit 43 discards a multicast packet and a broadcast packet received from one of the communication processing units 41 and 42. However, if a destination of the multicast packet or the broadcast packet is this core 24, then the communication processing unit 41 or 42 or an un-shown other processing unit performs a receipt process for this packet (such as parse of the packet or a process specified by the packet).

When the communication processing unit 41 receives a multicast packet or a broadcast packet, the forward processing unit 44 transmits this packet as-is to the local network 2 using the communication processing unit 42. However, the forward processing unit 44 does not transmit this packet to the local network 2 if a node required responding by this packet is a core that the forward processing unit 44 exists (i.e. the core 24, here).

For example, a packet for neighbor solicitation of ICMPv6 (Internet Control Message Protocol for IPv6) is a multicast packet which specifies all nodes as its destination, and this packet specifies an IP address as a target of address resolution. When a node having the specified IP address receives this packet, this node transmits a packet for neighbor advertisement of ICMPv6 which includes a MAC address (Media Access Control) of this node.

Therefore, if the core 24 can perform address resolution required by the packet for neighbor solicitation, that is, if the specified IP address is an IP address of the core 24 in either the virtual network 31 or the local network 2, then the forward processing unit 24 does not transmit the packet for neighbor solicitation to the local network 2 and performs a receipt process for this packet.

Further, if a multicast packet or a broadcast packet received by the communication processing unit 41 is a packet which requires a response, then when the forward processing unit 44 forwards this packet to the local network 2, the forward processing unit 44 identifies a core as a source of this packet (i.e. identifies its identification information such as an IP address of the core as the source); and when the forward processing unit 44 receives a response packet for this packet from the local network 2, the forward processing unit 44 transmits the response packet to the identified core as a destination of the response packet. However, if the identified core is a core that the forward processing unit 44 exists (i.e. the core 24, here), then the forward processing unit 44 does not transmit the response packet to the virtual network 31.

For example, if the core 24 transmits a packet for neighbor solicitation of ICMPv6 and receives a packet for neighbor advertisement as a response packet for this packet for neighbor solicitation from the local network 2, then the forward processing unit 44 does not transmit the response packet to the virtual network 31.

In the following part, a behavior of the aforementioned image forming apparatus is explained.

When the communication processing unit 41 in the core 24 receives a packet from the virtual network 31, if this packet is a unicast packet and its destination IP address is an IP address of the outside then the router function unit 43 performs address resolution and so forth for this packet and transmits this packet to the local network 2 using the communication processing unit 42. In this case, the forward processing unit 44 performs nothing for this packet.

On the other hand, if this received packet is either a multicast packet or a broadcast packet, then since the local network 2 is different from an IP network which a source of this packet belongs to, the router function unit 43 blocks this packet and does not transmit this packet to the local network 2. In this case, the forward processing unit 44 forwards this packet to the local network 2 using the communication processing unit 42. However, the forward processing unit 44 does not transmit this packet to the local network 2 if a node required responding by this packet is a core that the forward processing unit 44 exists (i.e. the core 24, here).

Therefore, when the cores 21 to 23 on the virtual network 31 transmit either a multicast packet or a broadcast packet to the virtual network 31, this packet reaches a device on the local network 2, that is, an IP network other than the virtual network 31. It should be noted that when the core 24 transmits either a multicast packet or a broadcast packet to the virtual network 31, this packet also reaches a device on the local network 2.

Further, if this packet transmitted to the local network 2 is a packet which requires responding, then a device on the local network 2 transmits a response packet to the local network 2. This response packet is received by the network interface 13 and the communication processing unit 42. If a response packet for either a multicast packet or a broadcast packet is received, then the forward processing unit 44 transmits this response packet to the virtual network 31. However, if a source of either the multicast packet or the broadcast packet is a core that the forward processing unit 44 exists (i.e. the core 24, here), then the forward processing unit 44 does not transmit the response packet to the virtual network 31.

Subsequently, the cores 21 to 23 on the virtual network 31 receive this response packet, but the other cores than a core which transmitted either the multicast packet or the broadcast packet (i.e. cores other than a destination of this response packet) discard this response packet.

In the aforementioned embodiment, in the core 24 that the router function unit 43 exists among the plural cores 21 to 24, the forward processing unit 44 forwards a multicast packet and/or a broadcast packet from the virtual network 31 to the local network 2.

In general, when a router connects different IP networks to each other inbetween them, the router blocks multicast packets and broadcast packets. However, because of this forward processing unit 44, whichever of the cores 21 to 24 in the CPU 11 can perform communication with the external local network 2 using a multicast packet or a broadcast packet.

The description of the present invention has been presented for purposes of illustration and description, and is not intended to be exhaustive or limited to the invention in the form disclosed.

For example, in the aforementioned embodiment, the forward processing unit 44 may transmit a packet to the local network 2 if the packet is either a predetermined multicast packet or a predetermined broadcast packet, and not to transmit the packet to the local network 2 if the packet is other than either the predetermined multicast packet or the predetermined broadcast packet.

In such a case, it prevents a multicast packet and/or a broadcast packet never used for communication with a device on the local network from forwarding and from causing an increase of traffic in the local network. In such a case, setting data which indicates a type of a packet to be forwarded (e.g.

a type of a protocol to be used for the packet) may have been stored in a table or the like in advance, and the forward processing unit 44 may determine whether the packet is forwarded or not on the basis of the setting data.

Further, in the aforementioned embodiment, IPv6 packets are described as examples. Alternatively, the aforementioned embodiment can be applied to IPv4 packets.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An information processing device, comprising:
a multi-core processor including plural cores;
a virtual network connecting the plural cores to each other;
a network interface;
a router function unit configured, in a core of the plural cores, to act as a router between the virtual network and a local network to which the network interface is connected; and
a forward processing unit configured, in the core that the router function unit exists, to forward either a multicast packet or a broadcast packet on the virtual network to the local network wherein:
the forward processing unit is further configured to identify a core as a source of either the multicast packet or the broadcast packet when the packet is forwarded, and transmit a response packet for the packet to the identified core as a destination of the response packet when the response packet is received from the local network.

2. The information processing device according to claim 1, wherein:
the forward processing unit is further configured not to transmit the response packet to the virtual network if the identified core is the core that the forward processing unit exists.

3. The information processing device according to claim 1, wherein:
the forward processing unit is further configured not to transmit the multicast packet or the broadcast packet to the local network if a node required responding by either the multicast packet or the broadcast packet is the core that the forward processing unit exists.

4. The information processing device according to claim 1, wherein:
the forward processing unit is further configured to transmit a predetermined ICMPv6 packet from the virtual network to the local network.

5. An information processing device, comprising:
a multi-core processor including plural cores;
a virtual network connecting the plural cores to each other;
a network interface;
a router function unit configured, in a core of the plural cores, to act as a router between the virtual network and a local network to which the network interface is connected; and
a forward processing unit configured, in the core that the router function unit exists, to forward either a multicast packet or a broadcast packet on the virtual network to the local network wherein:
the forward processing unit is further configured to transmit the packet to the local network if the packet is either a predetermined multicast packet or a predetermined broadcast packet, and not to transmit the packet to the local network if the packet is a packet other than either the predetermined multicast packet or the predetermined broadcast packet.

6. The information processing device according to claim 5, wherein:
the forward processing unit is further configured to transmit a predetermined ICMPv6 packet from the virtual network to the local network.

7. An image forming apparatus, comprising:
an information processing device;
wherein the information processing device comprises:
a multi-core processor including plural cores;
a virtual network connecting the plural cores to each other;
a network interface;
a router function unit configured, in a core of the plural cores, to act as a router between the virtual network and a local network to which the network interface is connected; and
a forward processing unit configured, in the core that the router function unit exists, to forward either a multicast packet or a broadcast packet on the virtual network to the local network wherein:
the forward processing unit is further configured to identify a core as a source of either the multicast packet or the broadcast packet when the packet is forwarded, and transmit a response packet for the packet to the identified core as a destination of the response packet when the response packet is received from the local network.

8. An image forming apparatus, comprising:
an information processing device;
wherein the information processing device comprises:
a multi-core processor including plural cores;
a virtual network connecting the plural cores to each other;
a network interface;
a router function unit configured, in a core of the plural cores, to act as a router between the virtual network and a local network to which the network interface is connected; and
a forward processing unit configured, in the core that the router function unit exists, to forward either a multicast packet or a broadcast packet on the virtual network to the local network wherein:
the forward processing unit is further configured to transmit the packet to the local network if the packet is either a predetermined multicast packet or a predetermined broadcast packet, and not to transmit the packet to the local network if the packet is a packet other than either the predetermined multicast packet or the predetermined broadcast packet.

* * * * *